United States Patent

Hansen

[15] 3,653,126

[45] Apr. 4, 1972

[54] DENTAL ARTICULATOR MODEL MOUNTING MEANS

[72] Inventor: Gorm P. Hansen, 4701 North Federal Highway, Fort Lauderdale, Fla. 33308

[22] Filed: Apr. 29, 1971

[21] Appl. No.: 138,697

[52] U.S. Cl. ....................................................32/32
[51] Int. Cl. ...............................................A61c 11/00
[58] Field of Search ........................................32/32, DIG. 6

[56] References Cited

UNITED STATES PATENTS 2,816,360  12/1957  Stuart ................................32/DIG. 6
2,884,696  5/1959  Bonfanti .............................32/DIG. 6

*Primary Examiner*—Robert Peshock
*Attorney*—Baldwin, Wight & Brown

[57] ABSTRACT

A dental model is attachable to and easily removable from a dental articulator arm by cooperating magnetic components, one fast with the arm and the other connected to the dental model. The cooperating attaching components are of wear-resistant material and are formed with interfitting aligning means. The arrangement is such that a dental model mounted on the articulator arm in a predetermined position may be detached by simply pulling the model away from the arm with sufficient force to overcome the magnetic attraction. Thereafter, the model may be replaced on the arm and positioned in the same predetermined position by the cooperation of the interfitting aligning means, and held magnetically in that position.

17 Claims, 4 Drawing Figures

PATENTED APR 4 1972 3,653,126

INVENTORS
GORM P. HANSEN

BY Baldwin, Wight & Brown
ATTORNEYS

DENTAL ARTICULATOR MODEL MOUNTING MEANS

This invention relates to dental articulators, and more particularly to a construction embodying means for attaching dental models to the relatively movable articulator arms or supports in a manner permitting facile detachment of the models and, when necessary, ready and easy re-attachment of the models on the articulator in precisely the same position as they occupied before detachment.

As is known, a dental articulator is used for mounting and aligning dental models in the same bite and chewing relation as the patient's teeth, and for duplicating or simulating the patient's jaw movements, so that the models and their cooperative relation may be observed and, if necessary, changed or refined. The articulator, with the models attached to its relatively movable supporting arms, is operable to simulate the patient's jaw action as closely as possible. This requires the models to be very accurately positioned on the supporting arms. At times it may be necessary to remove the models from the supports for being worked upon while detached from the articulator and then to be re-attached to the articulator for further checking. The re-attachment should be such that the models will be positioned in precisely the same relative positions as they occupied when first attached to the articulator. An elementary and commonly used procedure for attaching dental models to articulator arms has been to secure the models to the arms with plaster. Clearly, removal of so-attached models from articulator arms and re-attaching them with plaster has required great care and much time.

There have been a number of prior proposals to provide special attaching means which avoid re-plastering when the models, once detached from the articulator, are to be re-attached in the same relative positions as when originally mounted. Many of those proposals have involved the use of set screws, clamps and other special mechanical fastening devices requiring considerable time for operation, as well as expensive in manufacture. It has also been proposed to attach dental models to articulator arms magnetically without the use of screws, clamps or the like. Reference is made to the patent to Scullin, U.S. Pat. No. 3,221,408 issued Dec. 7, 1965.

An object of the present invention is to provide a construction including improved means for magnetically and releasably attaching a dental model to a model support, such as an arm, in a precisely predetermined position and in a manner permitting easy removal and re-attachment in the same position.

Another object of the invention is to provide a construction of the character stated including improved means for aligning a dental model on an articulator arm such that when a model, once properly positioned on the arm, is removed and is later re-attached to the arm, it will be positioned in precisely the same position as it occupied before being removed.

A further object of the invention is to provide such a construction in which the aligning means, which include interengaging elements on or attached to the articulator arm and the model respectively, are of wear-resistant material, e.g., metal, whereby repeated attachment and detachment of a model or models will not erode and destroy the accuracy of the aligning means.

Other objects of the invention will become apparent from a reading of the following description of a preferred embodiment, the appended claims, and the accompanying drawings, in which:

Figure 1:
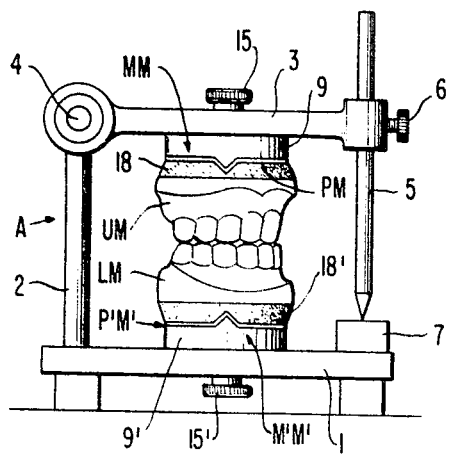
FIG. 1 is a side elevational view of a dental articulator provided with means for mounting dental models in accordance with the invention.

The invention is illustrated as being incorporated in or adapted for incorporation in a dental articulator generally designated A of substantially conventional construction including a lower support arm 1, a standard 2, and an upper support arm 3 movably mounted with respect to the lower arm 1 by being pivoted at 4 on the standard 2. The free or swingable end of the upper arm 3 is conventionally fitted with a vertically adjustable rod 5 held in adjusted position by a set screw 6, the lower end of the rod 5 being engageable with a pad 7 on the lower arm 1 for limiting the downward movement of the upper arm 3 relative to the lower arm 1.

The invention relates more particularly to an improved construction for attaching dental models to the articulator arms so that the models may be worked or manipulated in accordance with known practices to duplicate or simulate the jaw movements of the patient concerned. In the illustrative disclosure, the means shown for attaching an upper model UM to the pivoted articulator arm 3 and for attaching a lower dental model LM to the lower stationary articulator arm 1 are so constructed that the models UM and LM may readily be detached from the respective arms 3 and 1 and later readily re-applied to the associated arms. Consequently, after a pair of models UM and LM have been worked upon or observed when applied to the articulator arms, they may readily be detached so that the basic articulator structure may be used for working with a second pair of models of another patient. Thereafter, the second pair of models may be removed and the first pair readily re-applied or remounted on the arms 1 and 3 in precisely the same relative positions as they occupied before they were removed.

The attaching means for mounting the upper model UM on the arm 3 comprises, in part, a mounting member MM of corrosion resistant material which is mounted on the upper arm 3 in a manner described later so as to be fast therewith. In the use of an articulator embodying the invention, the mounting member MM may be considered as being permanently connected to the arm 3.

The attaching means for mounting the lower model LM on the arm 1 comprises, in part, a mounting member M'M' of corrosion resistant material which is made fast with the lower arm 1. The mounting members MM and M'M' are reverse images of each other. Thus, the lower face 8 of the member MM which is directed toward or faces the lower support arm 1, corresponds in reverse image to the upper face 8' of the mounting member M'M'. Other parts of the mounting members MM and M'M' also correspond reversely to one another. Consequently, the parts of the member M'M' are denoted by reference characters the same as the reference characters denoting like but reversely imaged parts of the member MM with the exception that the reference characters applied to the member M'M' are all primed. With this in mind, it will be clear that the FIG. 2 showing of the member M'M' and the FIG. 3 showing of the member MM jointly provide a full disclosure of the two mounting members.

Figure 2:
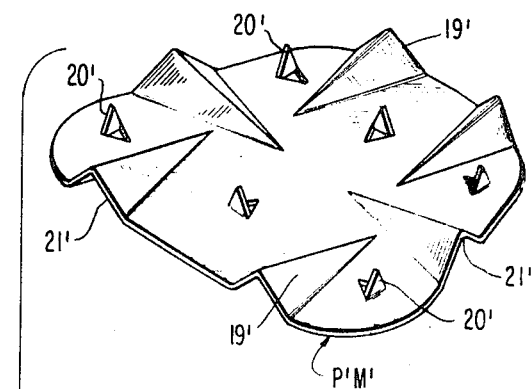
FIG. 2 is a perspective view of a mounting member and associated dental model attaching plate shown in separated relation, these parts being for mounting a lower dental model on the articulator shown in FIG. 1.
Figure 3:
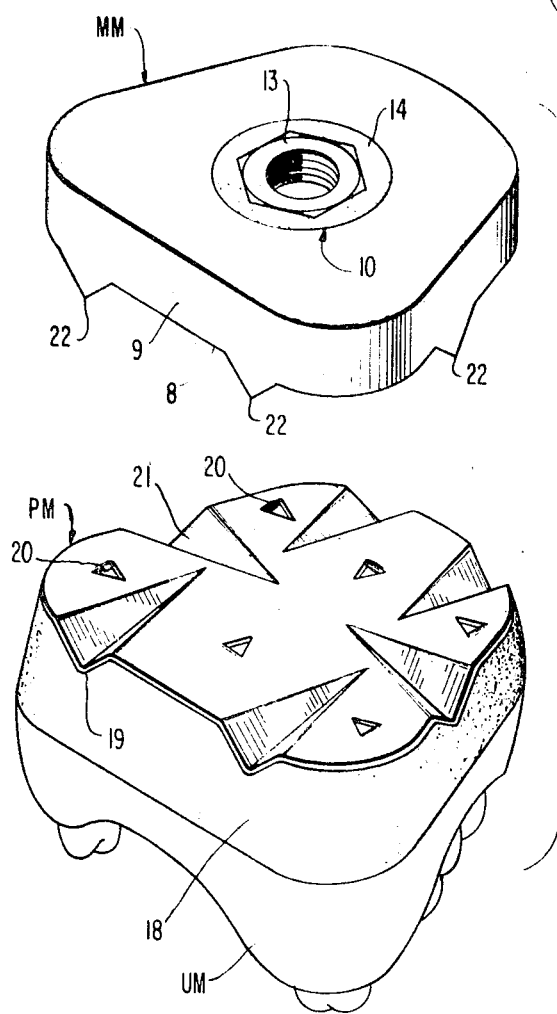
FIG. 3 is a perspective view of a mounting member and associated dental model attaching plate shown in separated relation, these parts being for mounting an upper dental model on the articulator shown in FIG. 1.
Figure 4:
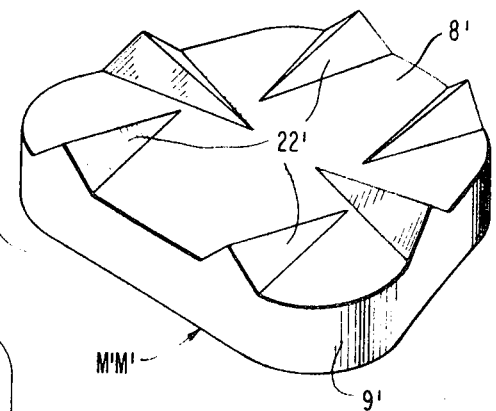
FIG. 4 is a fragmentary vertical section longitudinally through an upper articulator arm and an upper dental model and attaching means, drawn on an enlarged scale.

Returning to a specific consideration of the upper mounting member UM, including consideration of FIG. 4 as well as FIGS. 1–3, the member MM comprises a body 9 of non-corrosive material which may be relatively non-magnetic, for example being formed of aluminum. The body 9 has an internal seat 10 which extends longitudinally from the upper face of the body downwardly toward but which terminates short of the lower face 8 of the body, thereby leaving a thin transverse seat bottom wall 11 at the face 8 of the body 9. As shown in FIG. 4, the seat bottom wall 11 is very thin as compared to the longitudinal depth of the seat 10. For example, assuming the thickness of the body 9 to be about 12 mm, the thickness of the seat bottom wall may be as little as ½ mm. A permanent magnet 12, which may be of disk-like form, is positioned in the bottom part of the seat 10 so as to abut the seat bottom wall 11, the height of the magnet 12 being considerably less than the longitudinal depth of the seat 10 so as to leave a space in the seat between the top of the magnet and the upper face of the body 9. For maintaining the magnet 12 in this position, an internally threaded part, as shown a nut 13, is positioned in the space above the magnet 12 so as to abut the upper face of the magnet, the top face of the part 13 preferably being flush, or substantially so, with the top face of the body 9. The perimeter of the nut part 13 is spaced inwardly from the longitudinal wall of the seat 10 so as to provide a generally annular space receiving adhesive material 14, e.g., epoxy resin. The material 14 adheres to and secures in unitary assembly the body 9, the magnet 12 and the nut 13. For making this assembly fast with the upper articulator arm 3, a screw 15 is extended through an aperture 16 in the arm 3 with the threads of the screw engaging those of the nut 13. Tightening the screw brings a shoulder 17 thereon into engagement with the top surface of the arm 3 and draws the mounting member assembly MM into contact with the lower face of the arm 3, making the assembly fast with the arm.

The bottom seat wall 11, of non-magnetic material, is so thin that the magnet 12 is positioned very close to the bottom face 8 of the mounting member assembly MM so that the magnetic field created or provided by the magnet 12 extends considerably below the bottom face 8 of the assembly MM and is therefore adapted to attract and hold in position the upper dental model UM in a manner to be described later.

The means for attaching the upper model UM to the articulator arm 3 further comprises a pre-formed plate member PM of magnetic, e.g., ferrous, material which may conveniently and accurately be formed of uniform thickness stamped or pressed metal sheet so as to have a plurality of elongated wedge shaped protuberance means 19 and struck-out tabs or lugs 20. The protuberances 19 extend inwardly from the outer edges of the plate member PM toward its center and are triangular in cross section so as to present a tapered configuration, the protuberances diminishing in height from the outer edges of the plate member PM toward its center. The wedge shaped protuberances are deployed in space and mutually angular relation as shown in FIG. 3. Stamp or press forming of the protuberances 19 from the plate member PM provides resultant correspondingly shaped upwardly facing depression means 21 which serve as aligning means cooperable with other aligning means on the mounting member MM for positioning the upper model UM and plate member PM in a precisely predetermined position on the articulator arm 3 as will be described later.

The aforesaid other aligning means, i.e., those on the mounting member MM, comprise a plurality of protuberance means 22 which are shaped and positioned to correspond with the shaping and positioning of the depressions 21 in the plate member PM. When the member MM is mounted fast on the arm 3, its protuberances 22 face toward the lower arm 1.

In using equipment according to the invention, the mounting member MM is made fast with the upper articulator arm 3 in the position shown in FIG. 1. The plate member PM is then placed up under and against the mounting member MM in predetermined position determined by the interfitting engagement of the depressions 21 and the protuberances 22, the plate member then being held in this position by the attraction of the magnet 12. The dentist having established from the patient's jaw how the teeth are spacially related to the hinge of the jaw joint with the use of a jig in accordance with known practice, the dental model is placed on the jig and set in position spaced under the plate member PM which is then magnetically held on the mounting member MM. The dentist or technician then intersperses a layer 18 of settable material, which may be plaster, into the space between the plate member PM and the model UM. When the material 18 has set, it will be anchored to the model UM and also will be anchored to the plate member PM, the anchoring to the latter being assisted by the projection of the protuberances 19 and the lugs 20 downwardly from the plate member PM into the plaster material 18. The assembly comprising the upper model UM, the plaster layer 18 and the plate member PM will then be magnetically held on the upper articulator arm 3 in the proper predetermined position, after which the jig can be removed from the upper model UM. Once the upper model assembly has been so positioned with the plate member PM abutting the lower face of the mounting member MM, the assembly will be held firmly in place by the magnetic attraction between the mounting member MM and the plate member PM. However, the assembly can be forcibly detached by hand by simply pulling it downwardly to overcome the magnetic attraction. Clearly, when the assembly is subsequently returned to its position of being held on the articulator arm 3, the assembly necessarily will be in precisely the same position as it occupied before being detached.

The means for attaching the lower model LM to the articulator support arm 1 may be the same as the above described means for attaching the upper model UM to the support 3 with the exception that corresponding parts of these two means are mirror or reverse images of one another and are inverted relatively to one another. Suffice it to point out again that the parts of the lower attaching means correspond reversely to reversely similar parts in the upper attaching means, but are designated by primed reference characters the same as unprimed reference characters designating parts of the upper model attaching means. Thus, the lower model attaching means mounting member M'M' has the body 9' formed with protuberances 22'; and the lower model attaching plate member P'M' has protuberances 19' and depressions 21', and so on. The lower model mounting member body 9' is provided with a seat, magnet, threaded nut and adhesive (not shown) corresponding to the upper model mounting member seat 10, magnet 12, nut 13, and adhesive 14. The lower model mounting member M'M' is attached to the articulator arm 1 by a screw 15' in precisely predetermined position in the same manner as is described above for attaching the upper model mounting member MM to the arm 3. The lower model is, of course, releasably held on the articulator support 1 by magnetic attraction as described with reference to the upper model attachment.

It will be apparent that by virtue of the construction disclosed it is possible for a first set of dental models to be mounted in predetermined positions on the articulator arms or supports and the upper arm or support 3 manipulated to duplicate or similate the patient's jaw movements for observation by the dentist or technician. The first set of models may then be removed for being worked upon while off the articulator, thus leaving the articulator available for use in connection with a second set of models. If it is required to use the articulator again in connection with the first set of models for further work or observation, the second set may readily be detached and the first set may be replaced on the articulator arms so as to be returned to the precise predetermined positions which they occupied before removal. The construction greatly simplifies the attachment and removal of models which may be accomplished without manipulation of any screws, clips, or other mechanical attaching devices.

Since the mounting members MM and M'M' and the plate members PM and P'M' are all of metal or other pre-formed wear-resistant material, repeated attachment of the plates PM and P'M' to the mounting members MM and M'M', and consequent rubbing of their surfaces will not wear the surfaces and destroy the accuracy of interfitting of the aligning protuberances and depressions.

The mounting members MM and M'M', once attached to the arms 3 and 1, remain attached, and are used over and over again in connection with different model assemblies. The plate members PM and P'M', being thin and inexpensive, need not necessarily be removed from the plaster layers 18 and 18' for use in connection with other dental models, it being more convenient and economical to discard them and use new plate members when other models are to be mounted.

The construction shown and described by way of example embodies the invention in a preferred form, but it is intended that the disclosure be illustrative rather than definitive.

I claim:
1. A dental articulator comprising two relatively movable dental model supports, and two attaching means for attaching upper and lower dental models to said supports respectively, characterized in that at least one of said attaching means comprises a mounting member fast with one of said supports with one of its faces facing toward the other of said supports, said one of said faces comprising first protuberance means extending toward said other of said supports; a layer of set settable material joined to a dental model; and a pre-formed plate member having on one face second protuberance means extending into said layer and set therein, the other face of said plate member having depression means corresponding to said second protuberance means, said depression means interfitting with said first protuberance means for locating the assembly of said plate member, said layer and said dental model in a predetermined position on said mounting member and said one of said supports, one of said members having provision for creating a magnetic field and the other of said members being attractable magnetically by said magnetic field to hold the assembly of said plate member, said layer and said dental model releasably connected to said mounting member with said assembly in said predetermined position, said assembly being forcibly displaceable from said mounting member against the magnetic attraction between said members and being replaceable and re-locatable precisely in said predetermined position by the interfitting cooperation of said first protuberance means and said depression means.

2. A dental model articulator according to claim 1 in which both of said attaching means are constructed as set forth in the claim 1 characterizing definition of said at least one of said attaching means.

3. A dental model articulator according to claim 1 in which said plate member is metallic and is of substantially uniform thickness throughout, said depression means being aligned with and being reverse image of said second protuberance means.

4. A dental model articulator according to claim 2 in which said plate member is a sheet stamping.

5. A dental model articulator according to claim 4 in which said plate member has struck-out lugs extending into said layer of set settable material for assisting in securing said plate member to said layer.

6. A dental model articulator according to claim 1 in which said first and second protuberance means and said depression means are of wedge shape.

7. A dental model articulator according to claim 1 in which said first and second protuberance means both comprise a plurality of elongated protuberances extending from the edges of said mounting member and plate member respectively inwardly toward the central portions of said members respectively.

8. A dental model articulator according to claim 7 in which at least certain of said first protuberances and those of the second of said protuberances interfitting therewith are triangular in cross section and diminish in height from the edges of said members toward the central portions thereof.

9. A dental model articulator according to claim 1 in which said mounting member comprises a relatively non-magnetic body fast with said one of said supports and having an internal seat; and a magnet secured in said seat.

10. A dental model articulator according to claim 9 in which said magnet is secured in said seat by cementitious material.

11. A dental model articulator according to claim 9 in which said seat extends from an open seat end at the face of said body adjacent the associated support toward but terminates short of the opposite face of said body, leaving a seat bottom wall at said opposite face of said body, said magnet abutting the surface of said wall which faces toward said seat open end.

12. A dental model articulator according to claim 11 in which the thickness of said seat bottom wall is substantially less than the depth of said seat from said seat open end to said seat bottom wall.

13. A dental model articulator according to claim 11 in which said magnet is secured in said seat by cementitious material.

14. A dental articulator for mounting two companion dental models, comprising two relatively movable dental model supports; a relatively non-magnetic body fast with one of said supports and having a first face adjacent thereto and a second face facing the other of said supports, said body having an internal seat extending longitudinally from a seat open end adjacent said first face toward but terminating short of said second face, leaving a transverse seat bottom wall at said second face; a magnet secured in said seat and abutting the surface of said transverse seat bottom wall which faces toward said seat open end; magnetic material attached to one of said dental models and being magnetically attractable by said magnet for releasably holding said one of said dental models against said second face of said body; and means mounting the other of said dental models on the other of said dental model supports.

15. A dental model articulator according to claim 14 in which the thickness of said transverse seat bottom wall is substantially less than the longitudinal depth of said seat from said seat open end to said transverse seat bottom wall.

16. A dental model articulator according to claim 15 in which said magnet is of less thickness than the longitudinal depth of said seat, a threaded part being positioned in said seat between said magnet and seat open end and being secured to the longitudinal wall of said seat whereby to hold said magnet in said seat and abutting said transverse seat bottom wall; and a screw engaging the threads of said threaded part and said one of said supports for holding said threaded part, said body and said magnet fast with said one of said supports.

17. A dental model articulator according to claim 16 in which said threaded part has its perimeter spaced inwardly from the longitudinal seat wall to provide a generally annular space, and in which adhesive material fills said space and contacts and secures together said threaded part, said longitudinal seat wall and said magnet.

* * * * *